H. RICE.
Churn.
No. 44,219.  Patented Sept. 13, 1864.
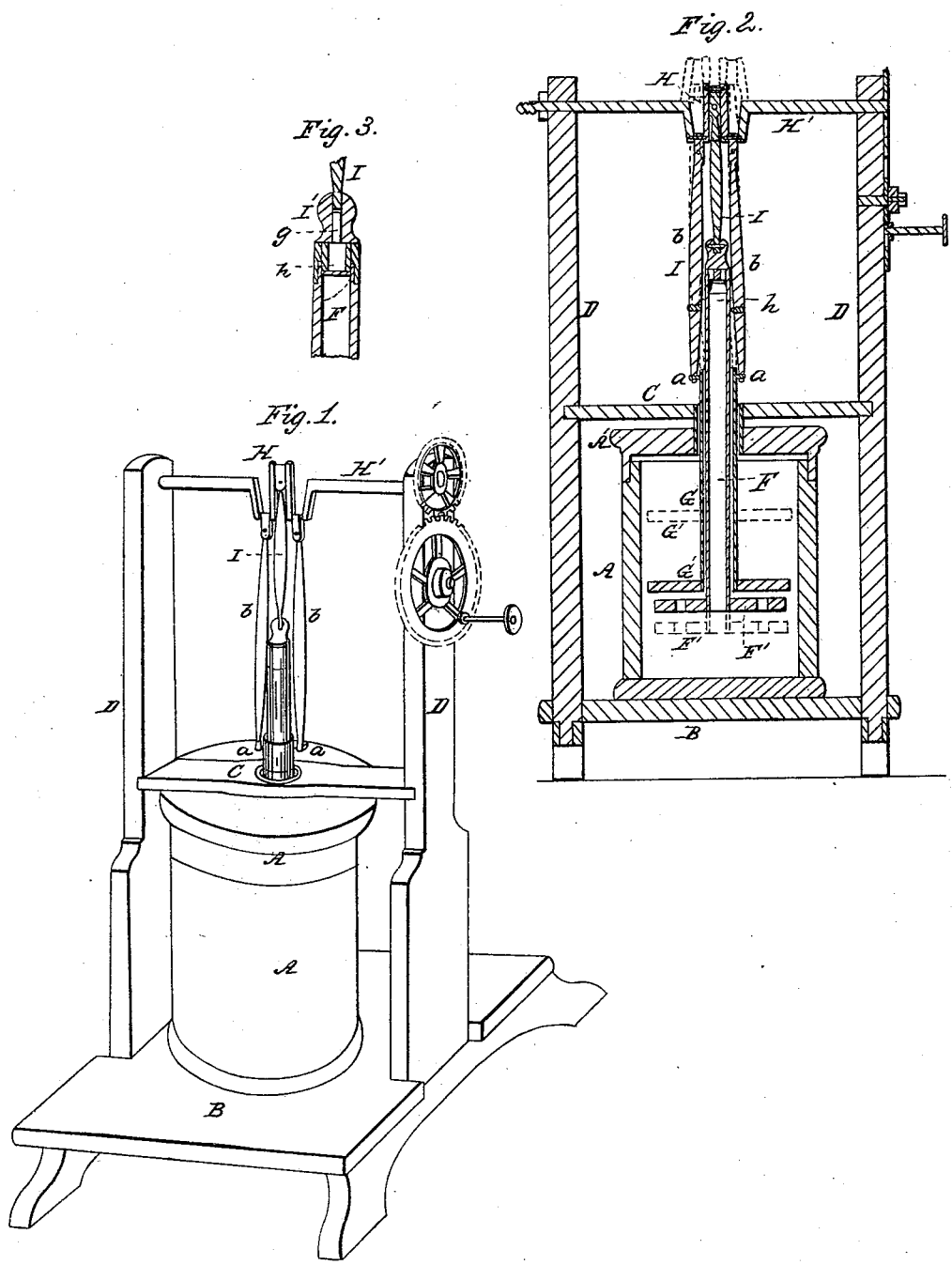
Witnesses:
Inventor:

UNITED STATES PATENT OFFICE.

H. RICE, OF YOUNGSTOWN, OHIO.

IMPROVEMENT IN CHURNS.

Specification forming part of Letters Patent No. 44,219, dated September 13, 1864.

*To all whom it may concern:*

Be it known that I, H. RICE, of Youngstown, in the county of Mahoning and State of Ohio, have invented certain new and useful Improvements in Churns; and I do hereby declare that the following is a full and complete description of the construction and operation of the same, reference being had to the accompanying drawings, making a part of this specification, in which—

Figure 1 is a perspective view. Fig. 2 is a vertical section. Fig. 3 is a detached section.

Like letters of reference indicate the same parts in the several views.

My improvement relates to a churn with reciprocating dashers, the shafts of which are hollow and move one within the other, being operated by a double crank connected with gearing; also, to the manner of conveying fresh air into the churn through a valve in the upper end of the inner shaft, that opens with the ascent and closes with the descent of the shaft.

A is the body of the churn, placed on the platform B and secured there by the brace C across the top, the ends of which fit into slots in the standards D, as represented. The brace is attached or connected to the cover A′ of the churn and is adjustable.

F and G are hollow shafts, the shaft F being within the shaft G, as shown in Fig. 2, to the lower ends of which are secured the dashers F′ G′.

To the outside shaft, G, above the brace C, is attached, by means of screws $a$, the connecting-rods $b$, jointed at the upper ends to the double crank H on the shaft H′, and I is a similar rod, connected to the crank and attached to the cap I′ on the upper end of the shaft F, by means of which the shafts are operated, the crank H being revolved by gearing on the end of the shaft H′.

Under the cap I′, in the upper end of the shaft F, is arranged the valve $h$, clearly represented in Fig. 3, which is an enlarged section of that part of the shaft. The valve opens downward, as indicated by the dotted line in Fig. 3—$g$ being the air-passage through the cap from under the connecting-rod I′ to the valve, as represented.

In operating this churn, by turning the double crank in connection with the shafts the shaft G, with the dasher G′, moves up into position indicated by the dotted lines G′ in Fig. 2, and at the same time the shaft F, with the dasher F′, is moved downward, as indicated by the dotted lines F, and by turning the crank or reversing it into the position shown in the figure the dasher G moves downward and the dasher F′ up into the position represented—the shafts moving reversely, one within the other, as described. Thus the dashers have a reciprocating motion, agitating the milk or cream in the most desirable manner, and the lower dasher, F′, is perforated, which increases the agitation—the milk, as it splashes through the holes, impinging on the under side of the dasher G′.

In connection with this action of the dashers, every time the shaft F and dasher F′ move up the valve $h$ is opened, as indicated in Fig. 3, and a current of fresh air is conveyed into the churn through the shaft, and as the dasher F′ is forced down the cream rises up in the inside of the shaft F and causes the air above it to close the valve, as represented, thereby preventing the milk from splashing out or up through the valve. In this way the most desirable motion is given to the cream, and at the same time fresh air is constantly distributed through it, which is essential in order to churn milk or cream in the most perfect manner.

What I claim as my improvement, and desire to secure by Letters Patent, is—

The special arrangement of the reciprocating hollow shafts G and F, dashers G′ F′, valve $h$, and air-passage $g$, in combination with the body A and connecting-rods $b\ b$ and I, as and for the purpose set forth.

H. RICE.

Witnesses:
W. H. BURRIDGE,
A. W. MCCLELLAND.